(12) United States Patent
Waechter et al.

(10) Patent No.: US 10,761,815 B2
(45) Date of Patent: Sep. 1, 2020

(54) SUPPORTING NON-ODATA SOURCES IN APPLICATION DEVELOPMENT

(71) Applicant: SAP SE, Walldorf (DE)

(72) Inventors: Marcel Waechter, Graben-Neudorf (DE); Andreas Hoffner, Östringen (DE)

(73) Assignee: SAP SE, Walldorf (DE)

( * ) Notice: Subject to any disclaimer, the term of this patent is extended or adjusted under 35 U.S.C. 154(b) by 2 days.

(21) Appl. No.: 16/208,981

(22) Filed: Dec. 4, 2018

(65) Prior Publication Data

US 2020/0174758 A1    Jun. 4, 2020

(51) Int. Cl.
| | |
|---|---|
| *G06F 16/955* | (2019.01) |
| *G06F 8/35* | (2018.01) |
| *G06F 16/25* | (2019.01) |
| *G06F 11/36* | (2006.01) |

(52) U.S. Cl.
CPC ............ *G06F 8/35* (2013.01); *G06F 11/3608* (2013.01); *G06F 16/258* (2019.01); *G06F 16/955* (2019.01)

(58) Field of Classification Search
CPC ........................................................ G06F 8/35
USPC ........................................................ 717/104
See application file for complete search history.

(56) References Cited

U.S. PATENT DOCUMENTS

| | | | | |
|---|---|---|---|---|
| 2015/0074136 A1* | 3/2015 | Falter | ................... | G06F 16/288 707/760 |
| 2017/0154137 A1* | 6/2017 | Shakeri | ................... | G06F 9/541 |
| 2018/0082227 A1* | 3/2018 | Goedken | ............... | G06Q 10/063 |
| 2018/0167493 A1* | 6/2018 | Klemenz | ............... | H04L 67/104 |

OTHER PUBLICATIONS

Kirchoff et al., Integrating OData Services . . . , 2014, ACM (Year: 2014).*

\* cited by examiner

*Primary Examiner* — John Q Chavis
(74) *Attorney, Agent, or Firm* — Sterne, Kessler, Goldstein & Fox P.L.L.C.

(57) ABSTRACT

Disclosed herein are system, method, and computer program product embodiments for supporting different data sources provided in developing applications. An embodiment operates by a processor receiving the application descriptor, which includes a first data source for providing a first portion of data for the application, the first data source providing the first portion of data as a first data type that is incompatible with the application. The processor can then determine whether the first data source provides the first portion of data as the first data type and request based on the determination, the first portion of data from the first data source. The processor can thereafter receive a modified first portion of data in the second data and create a model for the application based thereon.

20 Claims, 6 Drawing Sheets

Method 300

SUPPORTING NON-ODATA SOURCES IN APPLICATION DEVELOPMENT

Modern application development typically follows a metadata-driven development approach that heavily relies on OData services. Although this approach is suitable for applications based on OData services and OData annotations, it provides challenges for non-OData sources. Accordingly, application developers find it challenging to integrate non-OData sources with OData sources in a homogenous and harmonized manner since typically they are without proper library support for non-OData sources. Thus, integrating non-OData sources in applications based on OData services and OData annotations without the proper library support typically leads an inefficient and rigid user interface experience for application developers.

BRIEF DESCRIPTION OF THE DRAWINGS

The accompanying drawings are incorporated herein and form a part of the specification.

In the drawings, like reference numbers generally, indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for supporting different data sources (e.g., non-OData sources and OData sources) in developing applications. In doing so, a user's (e.g., an application developer's) efficiency in developing and/or maintaining applications relying on different data sources is significantly increased. Along these lines, a consistent user experience design across various applications irrespective of the data source is provided. This may allow computers to more efficiently integrate data from different data sources in developing applications.

Figure 1:
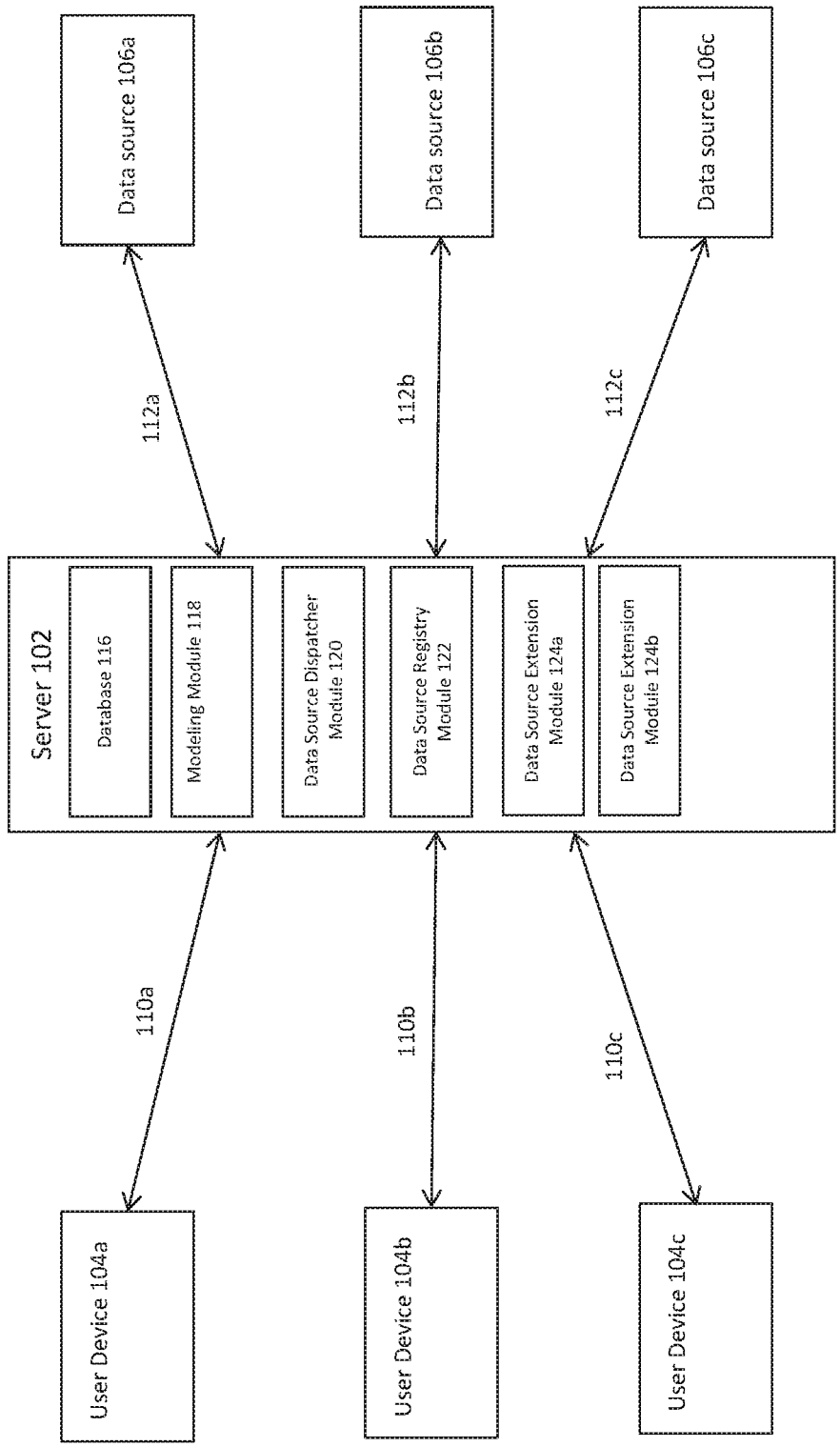
FIG. 1 is a block diagram of a system for supporting different data sources in developing applications, according to some embodiments.

Referring now to FIG. 1, a block diagram of a system 100 for supporting different data sources in developing applications is provided. The system 100 may comprise a server 102 and optionally one or more user devices 104 and data sources 106 (e.g., OData sources and/or non-OData sources). The server 102 and the user devices 104 may be in communication over a first line of communication 110. The server 102 and the data sources 106 may be in communication over a second line of communication 112. The first and second lines of communication 110, 112 may be private or public. For example, the first line of communication 110 may be public, and the second line of communication 112 may be private.

The server 102 may support applications (e.g., UI5 applications) that are associated with transactional workflows in a company and/or that are associated with a software development technology (e.g., HTML5, CSS, JS technology) via a user interface framework (e.g., SAP UI5). The applications may comprise elements that provide a particular user experience (e.g., Fiori elements). For example, the elements (e.g., Fiori elements) may provide a user with a unique, personalized, seamless, and simple experience across various enterprise applications (e.g., legacy and new enterprise applications). The applications may also not provide such elements and thus permit the user to freestyle in application development.

Moreover, the application can be run or executed on different types of user devices 104. As such, the user devices 104 may be any type of computing device capable of connecting (e.g., physically or wirelessly) to the server 102. For example, the user devices 104 may be a smartphone, a desktop, a personal computer, a tablet, or a mobile phone.

The server 102 may comprise a database 116, a modeling module 118, a data source dispatcher module 120, a data source registry module 122, and one or more data source extension modules 124. The modeling module 118 may be in communication with the database 116, the data source dispatcher module 120, and the data source registry module 122. The data source registry module 122 may be in communication with a particular data source extension module 124. Dependent on the type of data source 106 (e.g., OData source or non-OData source), the data source dispatcher module 120 may be in communication with a particular data source extension module 124 or a particular component thereof (e.g., a handler module as described with respect to FIG. 2). For example, if the data source 106 is an OData source, the data source dispatcher module 120 may not be in communication with the particular data source extension module 124 or the particular component thereof. However, if the data source 106 is a non-OData source, the data source dispatcher module 120 may be in communication with the particular data source extension module 124 or the particular component thereof.

The database 116 may store the applications, or data for supporting the applications, that may be run and/or executed on the user devices 104. As such, the database 116 may store an application descriptor for each application. The application descriptor may contain data for running and/or executing the application. As such, the application descriptor may include a first and second data source 106 and 106b for providing a first and second portion of data, respectively. The first data source 106a may be different than the second data source 106b. Likewise, the first portion of data may be different than the second portion of data. Moreover, the first data source 106a may provide a first data type, and the second data source 106b may provide a second data type different from the first data type. The first data type provided by the first data source 106a may be compatible with the application, whereas the second data type provided by the second data source 106b may be incompatible with the application. Along these lines, the portions of data provided by the first and second data sources 106a and 106b may be either metadata or runtime data for the application.

For example, the first and second data sources 106a and 106b may be either OData sources or non-OData sources. Examples of non-OData sources include REST-based services or data stored in simple JSON files bundled with the application. As such, the OData sources may provide a portion of data in the form of OData. and the non-OData sources may provide a portion of data in the form of non-OData. The OData may be compatible with the application, whereas the non-OData may be incompatible with the application. Moreover, as stated above, the portion of data may be either metadata or runtime data for the application. As such, the OData sources and the non-OData sources may each provide metadata and runtime data for the application.

The modeling module 118 may receive the data for running and/or executing the application from the database 116. The modeling module 118 may then identify data sources provided in the application descriptor. The modeling module 118 may thereafter determine whether the identified data source 106a or 106b is a first source type or a second source type. Subsequently, the modeling module 118 may determine that the first source type provides a portion of data as a first data type and/or that the second source type provides a portion of data as a second data type. For example, the modeling module 118 may identify the first data source 106a as a first source type (e.g., a non-OData source) and determine that it provides a portion of data as a first data type (e.g., non-OData). The modeling module 118 may also identify the second data source 106b as a second source type (e.g., an OData source) and determine that it provides a portion of data as a second data type (e.g., OData).

The modeling module 118 may then determine if the data types provided by the data sources 106 are capable of being compatible with the application. As such, the modeling module 118 may determine if a particular data type (e.g., non-OData) is compatible with the application. To make a determination, the modeling module 118 may send a request to a corresponding extension class. Based on the determination, the modeling module 118 may be in communication with the data source registry module 122 for the data source registry module 122 to register the particular data type and/or data source providing the data type. Thus, the data source registry module 122 may store various data types (e.g., non-OData and OData) capable of providing functions to the application.

Based on the determined data type (e.g., a first data type or a second data type), the modeling module 118 may send a request for the portion of data to a particular data source 106 or the data source dispatcher module 120. As such, if the portion of data is a first data type (e.g., an OData type), the modeling module 118 may send a request for the portion of data to the data source dispatcher module 120. The data source dispatcher module 120 will then forward the request to a particular data source extension module 124a that corresponds to the first data source 106a—different than the data source that the modeling module 118 is in communication with—of the first data type. The data source extension module 124a will thereafter communicate with the first data source 106a to receive the portion of data and transmit a modified first portion of data in the second data type that is compatible with the application to the modeling module 118.

Figure 2:
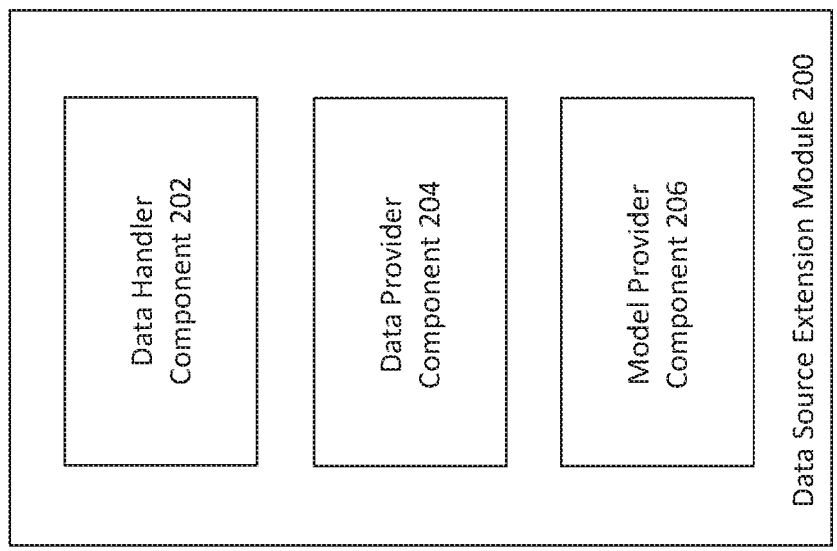
FIG. 2 is a block diagram of a data source extension module of FIG. 1, according to some embodiments.

FIG. 2 provides an exemplary data source extension module 200 of FIG. 1. The data source extension module 200 may comprise a data handler component 202, a data provider component 204, and a model provider component 206. The data handler component 202 may be in communication with the data source dispatcher module 120 (FIG. 1), the data provider component 204, and the model provider component 206. The data provider component 204 and the model provider component 206 may be in communication with the first data source 106a (FIG. 1).

Upon receiving a request from the data source dispatcher module 120 (FIG. 1), the data handler component 202 may request data from the data provider component 204, which in turns requests data from the first data source 106a. The model provider component 206 may then receive the first portion of data from the first data source 106a. The model provider component 206 may then transform the first portion of data from the first type to the second type to create a modified first portion of data in the second data type that is compatible with the application. As stated above, in some embodiments the first data source 106a may be a non-OData source, the first portion of data may originally be in the form of non-OData. Accordingly, the model provider component 206 may transform the first portion of non-OData to a first portion of OData.

Referring back to FIG. 1, although the data source dispatcher module 120 may forward the request for data to the data source extension module 124a when the portion of data is the first type, the data source dispatcher module 120 may also search in the cache for the modified first portion of data. However, this may depend on whether the first portion of data is metadata or runtime data. For example, if the first portion of data is metadata, the data source dispatcher module 120 may search cache for the modified first portion of metadata. However, if the first portion of data is runtime data, the data source dispatcher module 120 may then automatically route the request to the data source extension module 124a in the manner discussed above.

As stated above, the modeling module 118 may determine that the identified data source 106a is of the second type and determine that the second source type provides the portion of data as the second data type. For example, the modeling module 118 may determine that the identified data source 106a is a non-OData source and that the portion of data is provided as non-OData.

Accordingly, when the modeling module 118 identifies the second data source, the modeling module 118 may request the portion of data from a particular data source 106b. The data source 106b in which the modeling module 118 communicates with upon identification of the second data source may be different than the data source 106a the modeling module 118 communicates with upon identification of the first data source. As such, the first data source can provide services compatible with the first data type provided by the data source 106b. For example, the second data source may be an OData source and provide the portion of data in the form of OData. The OData source may also provide OData sources.

Moreover, depending on whether the portion of data is metadata or runtime data and is the first data type or the second data type, the data source 106a may handle the request from the modeling module 118 differently. For example, if the portion of data is metadata and the first data type (e.g., OData), the modeling module 118 may receive metadata in common scheme definition language (CSDL) from the data source 106b. However, if the portion of data is metadata and is the second type of data (e.g., non-OData), the modeling module 118 may only receive the desired metadata. As discussed above with respect to FIG. 2, the desired metadata can then be transformed to be compatible with the application Along these lines, if the portion of data is runtime data and is either the first type of data or the second type of data, the modeling module 118 may only receive the desired runtime data.

After receipt of the portion of data in the first data type from the data source 106 or the data source dispatcher module 120, the modeling module 118 may create a single data model for a particular user interface framework (e.g., SAP UI5). The data model may be based on the second data type and may support the modified first data type and the second data type in its original form. As such, the data model may be of the same type as the second data type. Thus, the data model may be an OData model and/or be based on OData services.

Along these lines, the modeling module 118 may be configured to create different versions of the model to be suitable for the application. The application descriptor may specify the version of the data model for the modeling module 118 to create. For example, the modeling module 118 may create an OData v2 model or an OData v4 model. Moreover, modeling module 118 may have a default version if the application descriptor does not specify the version of the data model. The default model version may be the OData v4 model.

Figure 3:
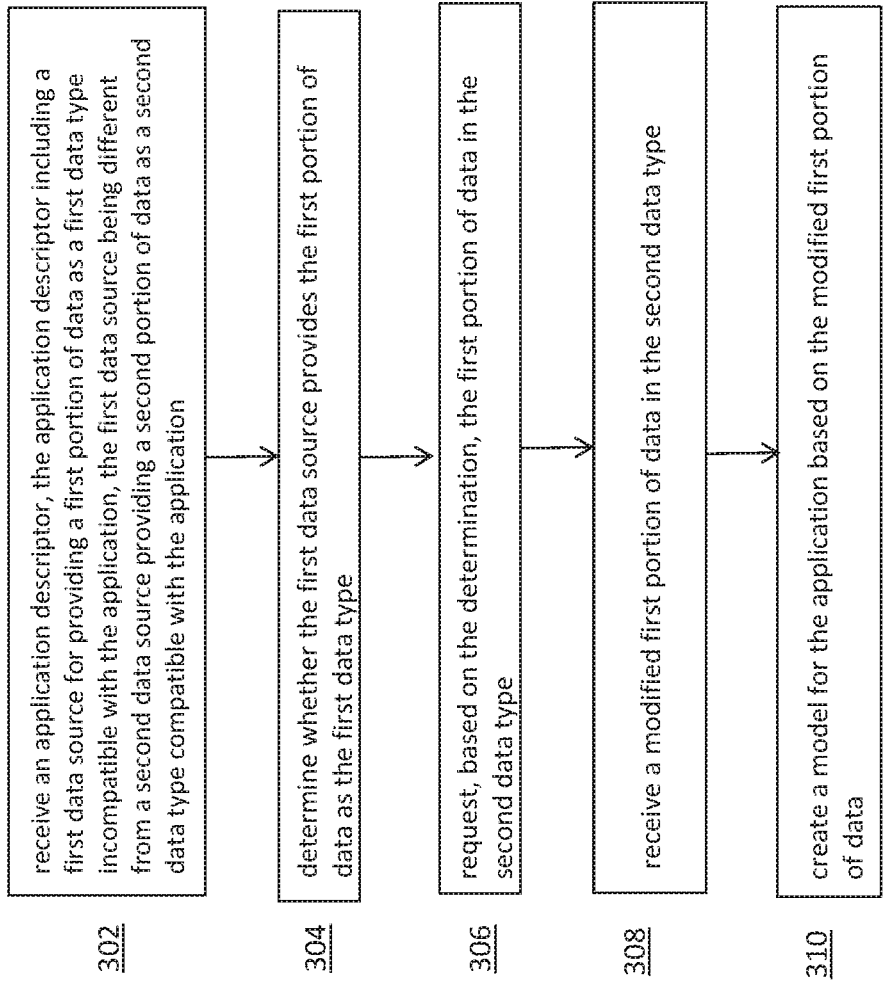
FIGS. 3-5 are processes for supporting different data sources in developing applications, according to some embodiments.
Figure 4:
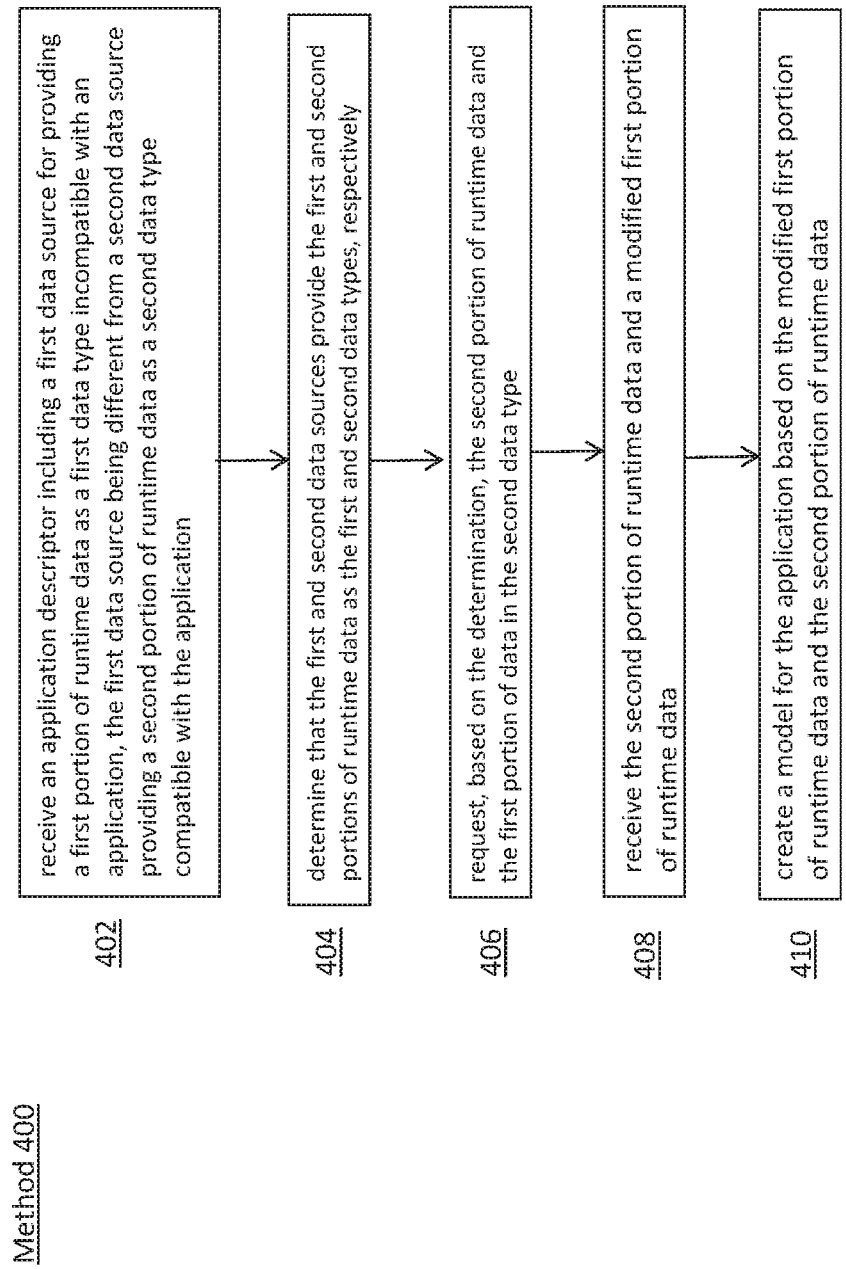
Figure 5:
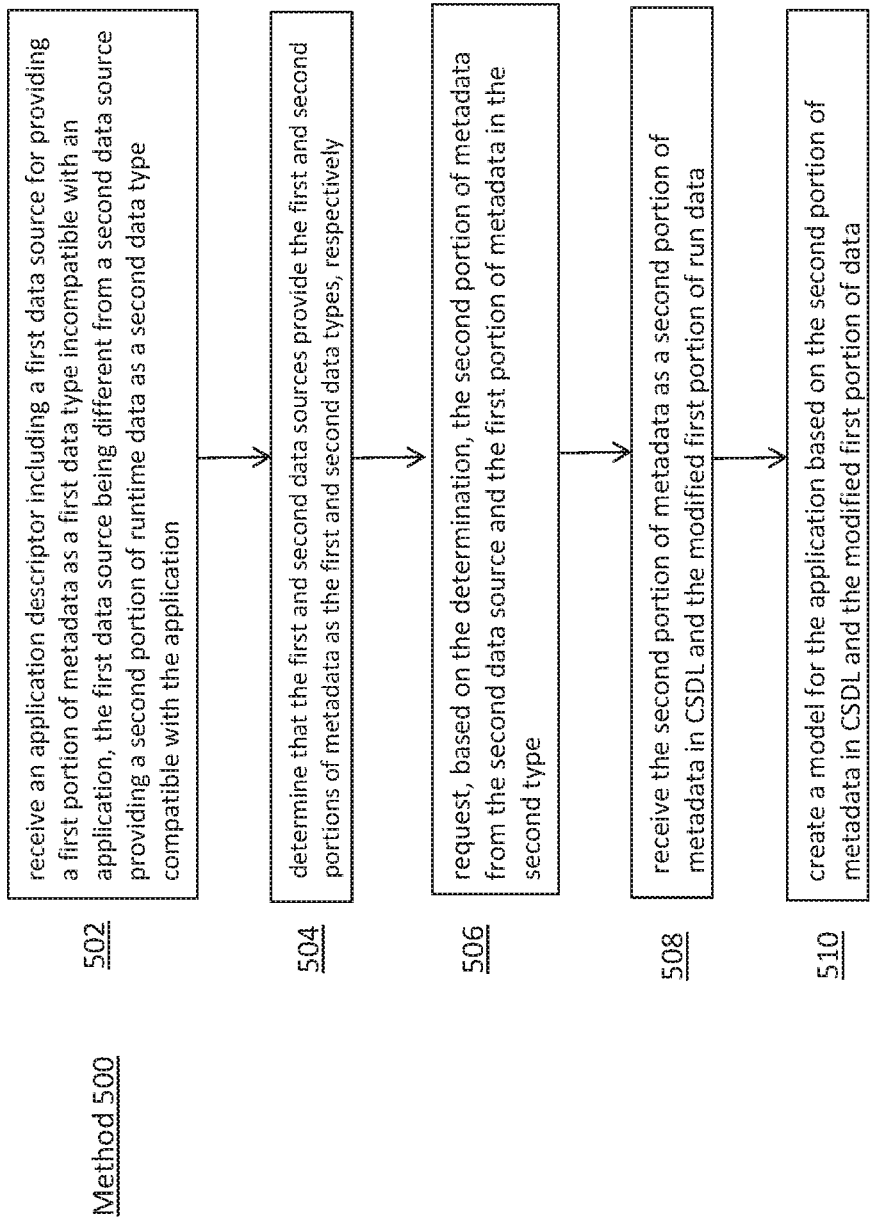

FIGS. 3-5 are flowcharts for methods 300, 400, 500 for supporting different data sources in developing applications, according to an embodiment. Methods 300, 400, 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Methods 300, 400, 500 shall be described with reference to FIGS. 1 and 2. However, methods 300, 400, 500 are not limited to that example embodiment.

Referring now to FIG. 3, a flowchart for method 300 for supporting different types of data sources providing different types of data to develop applications is provided.

In 302, a module of a server receives an application descriptor including a first data source for providing a first portion of data as a first data type incompatible with the application. The first data source being different than a second data source providing a second portion of data as a second data type that is compatible with the application. The application descriptor may also include the second data source.

The server 101 may comprise a database 116 and a modeling module 118. The database 116 may store the application descriptor, and the modeling module 118 may receive the application descriptor from the database 116. Along these lines, the first data source and the second data source may be a non-OData source and an OData source, respectively. Thus, the first data type and the second data type may be non-OData and OData, respectively.

In 304, the module determines whether the first data source provides the first portion of data as the first data type.

The modeling module 118 may perform the determination of 304. Specifically, the modeling module 118 may determine that the first data source is a non-OData source that provides the first portion of data as non-OData.

In 306, the module requests, based on the determination, the first portion of data in the second data type.

For example, the modeling module 118 may request the first portion of data in the second data type from a data source dispatcher module 120. As the first data source is a non-OData source, the data source 106 may be a non-OData source. The data source dispatcher module 120 may have previously stored a modified portion of data representing the first portion of data in the second type.

In 308, the module receives a modified first portion of data in the second data type.

For instance, the modeling module 118 may receive the modified portion of data from the data source dispatcher module 120 or a corresponding data source extension module 124*a*. As stated above, the data source dispatcher module 120 may receive the request for the first portion of data in the second data type. Thereafter, the data source dispatcher module 120 may determine if a modified first portion of data in the second data type is available in cache. If the modified first portion of data in the second data type is not available in cache, the data source dispatcher module 120 may forward the request to the data source extension module 124*a*. Upon receiving the request, a model provider component 206 of the data source extension module 124*a* may request the first portion of data from a correspond data source 106*a* and upon receiving the first portion of data, transform the first portion of data from the first type to the second type to create the modified first portion of data in the second type. Thereafter, the modeling module 118 may receive the modified first portion of data from the data source extension module 124*a*.

In 310, the module creates a model for the application based on the modified first portion of data.

Specifically, the modeling module 118 may create a model for the application based on the modified first portion of data. The modeling module 118 may create a model for the application based on a portion of data that was previously non-OData and is now OData compatible.

Referring now to FIG. 4, a flowchart for method 400 for supporting different types of data sources providing metadata to develop applications is provided.

In 402, a module of a server receives an application descriptor. The application descriptor includes a first data source for providing a first portion of runtime data as a first data type incompatible with an application. The first data source being different than a second data source providing a second portion of runtime data as a second data type that is compatible with the application. The application descriptor may also include the second data source The server 101 may comprise a database 116 and a modeling module 118. The database 116 may store the application descriptor, and the modeling module 118 may receive the application descriptor from the database 116. Along these lines, the first data source 106*a* and the second data source 106*b* may be a non-OData source and an OData source, respectively. Thus, the first data type and the second data type may be non-OData and OData, respectively.

In 404, the module determines that the first and second data sources store the first and second portions of runtime data as the first and second data types, respectively.

The modeling module 118 may perform the determination of 304. Specifically, the modeling module 118 may determine that the first data source 106*a* is a non-OData source that provides the first portion of runtime data as non-OData, and that the second data source 106*b* is an OData source that provides the second portion of runtime data.

In 406, the module requests, based on the determination, the second portion of runtime data and the first portion of runtime data in the second data type.

For example, the modeling module 118 may request the second portion of runtime data from the second data source 106*b*. As stated above, the second data source 106*b* may be an OData source. Accordingly, the OData source may provide OData services to the modeling module 118. Moreover, the modeling module 118 may request the first portion of runtime data via the data source dispatcher module 120 as described with respect to FIG. 3. However, the data source dispatcher may not search within cache for the first portion of runtime data in the second type as described with respect to FIG. 3. Rather, the data source dispatcher 120 may forward the request to a corresponding data source extension 124a.

In 408, the module receives the second portion of runtime data and a modified first portion of runtime data.

For instance, the modeling module 118 may receive the second portion of runtime data directly from a corresponding data source 106b, and may receive the modified first portion of runtime data from the data source extension module 124a. As such, the modified module 118 may receive the second portion of runtime data from a OData source. Moreover, as stated above, the model module 118 may request the first portion of runtime data in the second type from the data source dispatcher module 120. The data source dispatcher module 120 may forward the request to the data source extension module 124a, which may request the first portion of runtime data from a corresponding data source 106a (different from data source 106b). The data source 106a may be a non-OData source. Upon receiving the first portion of runtime data, a model provider component 206 of the data source extension model 124 may transform the first portion of runtime data from the first type to the second type to create the modified first portion of runtime data. Thereafter, the modeling module 118 may receive the modified first portion of runtime data from the data source extension module 124a.

In 410, the module creates a model based on the modified first portion of runtime data and the second portion of runtime data.

Specifically, the modeling module 118 may create a model for the application based on the modified first portion of runtime data. As such, the modeling module 118 may create a model for the application based on runtime data that was previously non-OData and is now OData compatible as well as runtime that is OData.

Referring now to FIG. 5, a flowchart for method 500 for supporting different types of data sources providing runtime data to develop applications is provided.

In 502, a module of a server receives an application descriptor. The application descriptor includes a first data source for providing a first portion of metadata as a first data type that is incompatible with an application. The first data source being different from a second data source providing a second portion of metadata as a second data type that is compatible with the application. The application descriptor can also include the second data source.

The server 101 may comprise a database 116 and a modeling module 118. The database 116 may store the application descriptor, and the modeling module 118 may receive the application descriptor from the database 116. As such, the modeling module 118 may receive the application descriptor from the database 116. Along these lines, the first data source 106a and the second data source 106b may be a non-OData source and an OData source, respectively. Thus, the first data type and the second data type may be non-OData and OData, respectively.

In 504, the module determines that the first and second data sources provide the first and second portions of metadata as the first and second data types, respectively.

The modeling module 118 may perform the determination of 304. Specifically, the modeling module 118 may determine that the first data source is a non-OData source that provides the first portion of data as non-OData.

In 506, the module requests, based on the determination, the second portion of metadata from the second data source and the first portion of metadata in the second type.

For example, the modeling module 118 may request the second portion of metadata from the data source 106b. As stated above, the second data source 106b may be an OData source. Accordingly, the OData source may provide OData services to the modeling module 118. Moreover, the modeling module 118 may request the second portion of metadata from a data source dispatcher module 120. As the first data source is a non-OData source, the data source 106 may be a non-OData source. The data source dispatcher module 120 may have previously stored a modified portion of metadata representing the first portion of metadata in the second type.

In 508, the module receives the second portion of metadata as a second portion of metadata in CSDL and the modified first portion of runtime data.

For instance, the modeling module 118 may receive the second portion of metadata form the data source 106b. Specifically, although not requested, the modeling module 118 may receive the second portion of metadata in CSDL from the data source 106 b.

Moreover, the modeling module 118 may receive the modified portion of metadata from the data source dispatcher module 120 or a corresponding data source extension module 124a. As stated above, the data source dispatcher module 120 may receive the request for the first portion of data in the second data type. Thereafter, the data source dispatcher module 120 may determine if a modified first portion of data is available in cache. If the modified first portion of data in the second data type is not available in cache, the data source dispatcher module 120 may forward the request to the data source extension module 124a. Upon receiving the request, a model provider component 206 of the data source extension module 124a may request the first portion of data from a correspond data source 106a and upon receiving the first portion of data, transform the first portion of data from the first type to the second type to create the modified first portion of data in the second type. Thereafter, the modeling module 118 may receive the modified first portion of data from the data source extension module 124a.

In 510, the module creates a model for the application based on the second portion of $metadata and the modified first portion of data.

Specifically, the modeling module 118 may create a model for the application based on the modified first portion of runtime data. As such, the modeling module 118 may create a model for the application based on runtime data that was previously non-OData and is now OData compatible as well as runtime data that is now in the form of $metadata.

Figure 6:
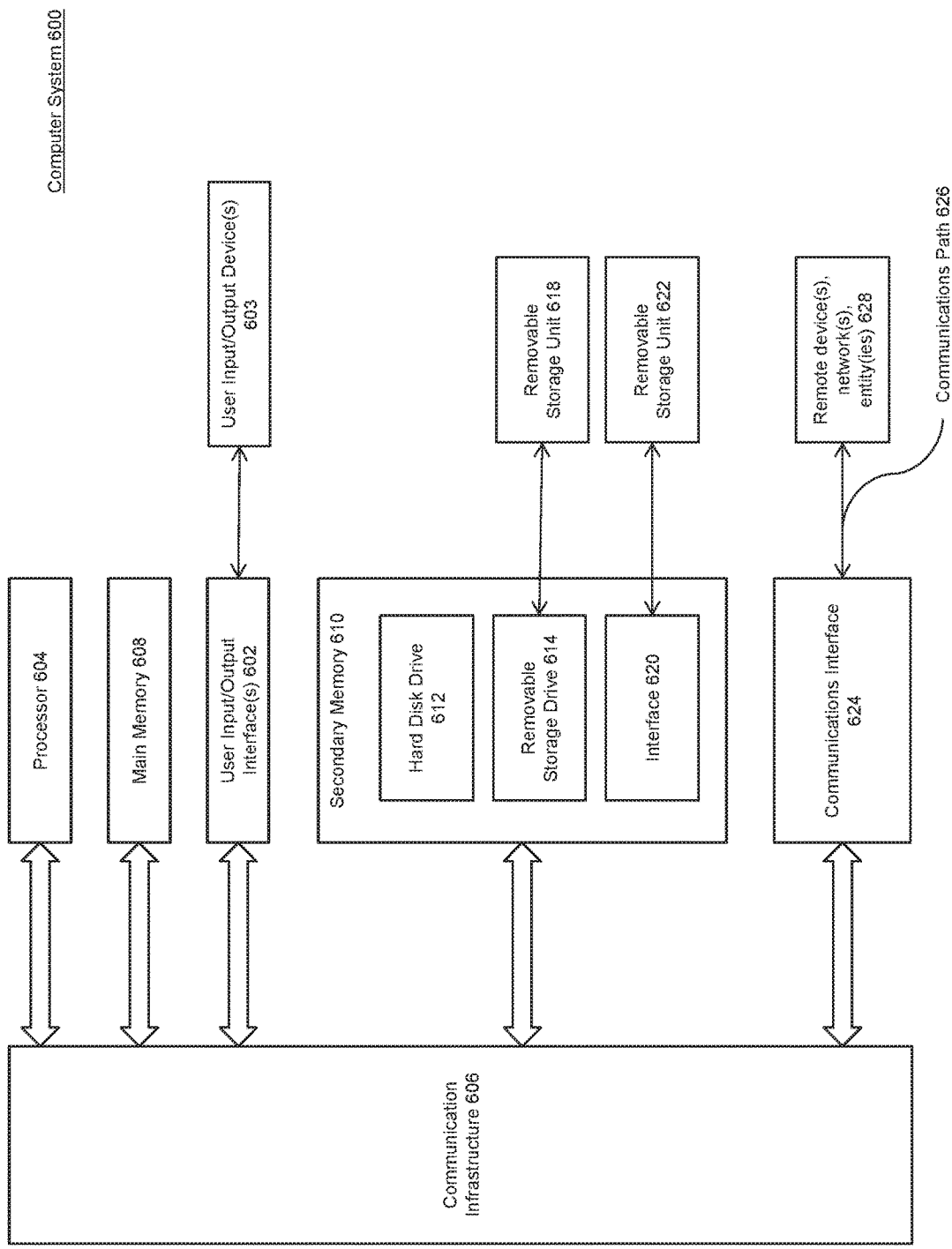
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to the removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions): "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML). Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method for developing an application, comprising:
   receiving, by at least one processor, an application descriptor, the application descriptor including a first data source for providing a first portion of data as a first data type incompatible with the application, the first data source being different from a second data source providing a second portion of data as a second data type compatible with the application;
   determining, by the at least one processor, whether the first data source provides the first portion of data as the first data type;
   requesting, by the at least one processor and based on the determination, the first portion of data in the second data type;
   receiving, by the at least one processor, a modified first portion of data in the second data type that is compatible with the application; and
   creating, by the at least one processor, a model for the application based on the modified first portion of data, wherein at least one of the receiving, determining, requesting, receiving, and creating is performed by one or more modules of a server.

2. The computer-implemented method of claim 1, further comprising:
   determining, by the at least one processor, whether the first data type of the first data source is capable of being converted to the second data type,
   wherein the converting of the first data type of the first data source to the second data type is based on the determination of whether the first data type is capable of being converted to the second data type.

3. The computer-implemented method of claim 2, further comprising:
   registering, by the at least one processor, the first data source with the server.

4. The computer-implemented method of claim 1, further comprising:
   providing, by the at least one processor, an interface for communication between the server and each of the first data source and the second data source,
   wherein the interface is configured to support the model for the application.

5. The computer-implemented method of claim 1, wherein the application descriptor includes the second data source for providing the second portion of data as the second data type.

6. The computer-implemented method of claim 5, wherein the first data source and the second data source are external to the server.

7. The computer-implemented method of claim 5, further comprising:
   receiving, by the at least one processor, when the second data source is the second source type, the second data type,
   wherein the model for the application is created based on the modified first data and the second data type.

8. The computer-implemented method of claim 5, wherein the model is configured to be compatible with the second data type.

9. The computer-implemented method of claim 5, wherein the model is configured to permit navigation between the first data source and the second data source.

10. The computer-implemented method of claim 1, the receiving further comprising:
    determining whether the modified first portion of data is stored in a database of the server, and
    receiving, based on the determination, the modified first portion of data from the database of the server.

11. The computer-implemented method of claim 9, the receiving further comprising:
    receiving, based on the determination, the first portion of data from the first data source; and
    converting the first portion of data from the first data type to the second data type to create the modified first portion data type compatible with the second data type.

12. The computer-implemented method of claim 1, wherein the first portion of data is either metadata or runtime data.

13. The computer-implemented method of claim 1, wherein the first source type is a non-OData source and the first data type is non-OData, and wherein the second source type is an OData source and the second data type is OData metadata.

14. The computer-implemented method of claim 13, wherein the model is an OData model.

15. The computer-implemented method of claim 13, wherein the OData model is either a first version or a second version.

16. The computer-implemented method of claim 15, further comprising:
    determining, by the at least one processor, whether the application descriptor specifies the first version for the OData model,
    wherein the OData model is the first version based on the determination of whether the application descriptor specifies the first version for the OData model.

17. The computer-implemented method of claim 16, wherein the first version for the OData model is OData model v4, and wherein the second version for the OData model is OData model v2.

18. A system, comprising:
    a memory; and
    at least one processor coupled to the memory and configured to:
       receive an application descriptor, the application descriptor including a first data source for providing a first portion of data for as a first data type compatible with the application, the first data source being different from a second data source providing a second portion of data as a second data type incompatible with the application;

determine whether the first data source provides the first portion of data as the first data type;

request, based on the determination, the first portion of data in the second data type;

receive a modified first portion of data in the second data type that is compatible with the application; and create a model for the application based on the modified first portion of data.

19. The system of claim 18, wherein the first source type is a non O-Data source and the second source type is an OData source.

20. A non-transitory computer-readable device having instructions stored thereon that, when executed by at least one computing device, cause the at least one computing device to perform operations comprising:

receiving an application descriptor, the application descriptor including a first data source for providing a first portion of data as a first data type incompatible with an application, the first data source being different from a second data source providing a second portion of data as a second data type compatible with the application;

determining whether the first data source provides the first portion of data as the first data type;

requesting, based on the determination, the first portion of data in the second data type;

receiving a modified first portion of data in the second data type that is compatible with the application; and creating a model for the application based on the modified first portion of data.

* * * * *